Dec. 4, 1956 J. H. HOLAN ET AL 2,772,913
SIDE STRUCTURES OF UTILITY TRUCK BODIES
Filed Sept. 3, 1953 2 Sheets-Sheet 1
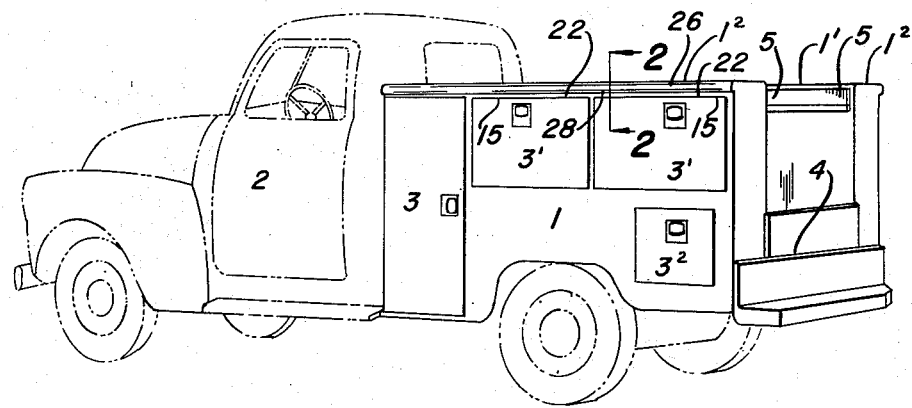
FIG. 1
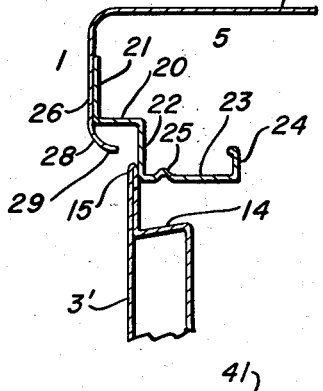
FIG. 2
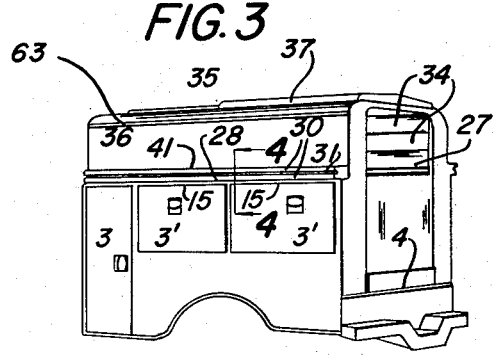
FIG. 3
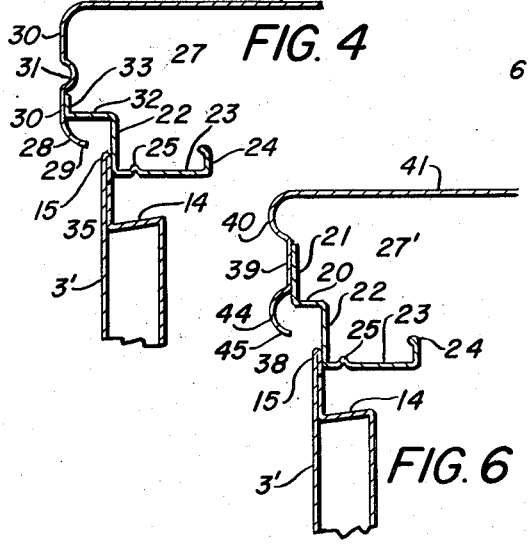
FIG. 4
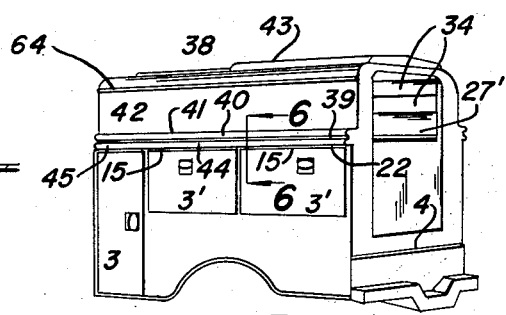
FIG. 5
FIG. 6
INVENTORS
JAMES HOWARD HOLAN
& HERMAN J. TROCHE
BY George W. Saywell
ATTORNEY

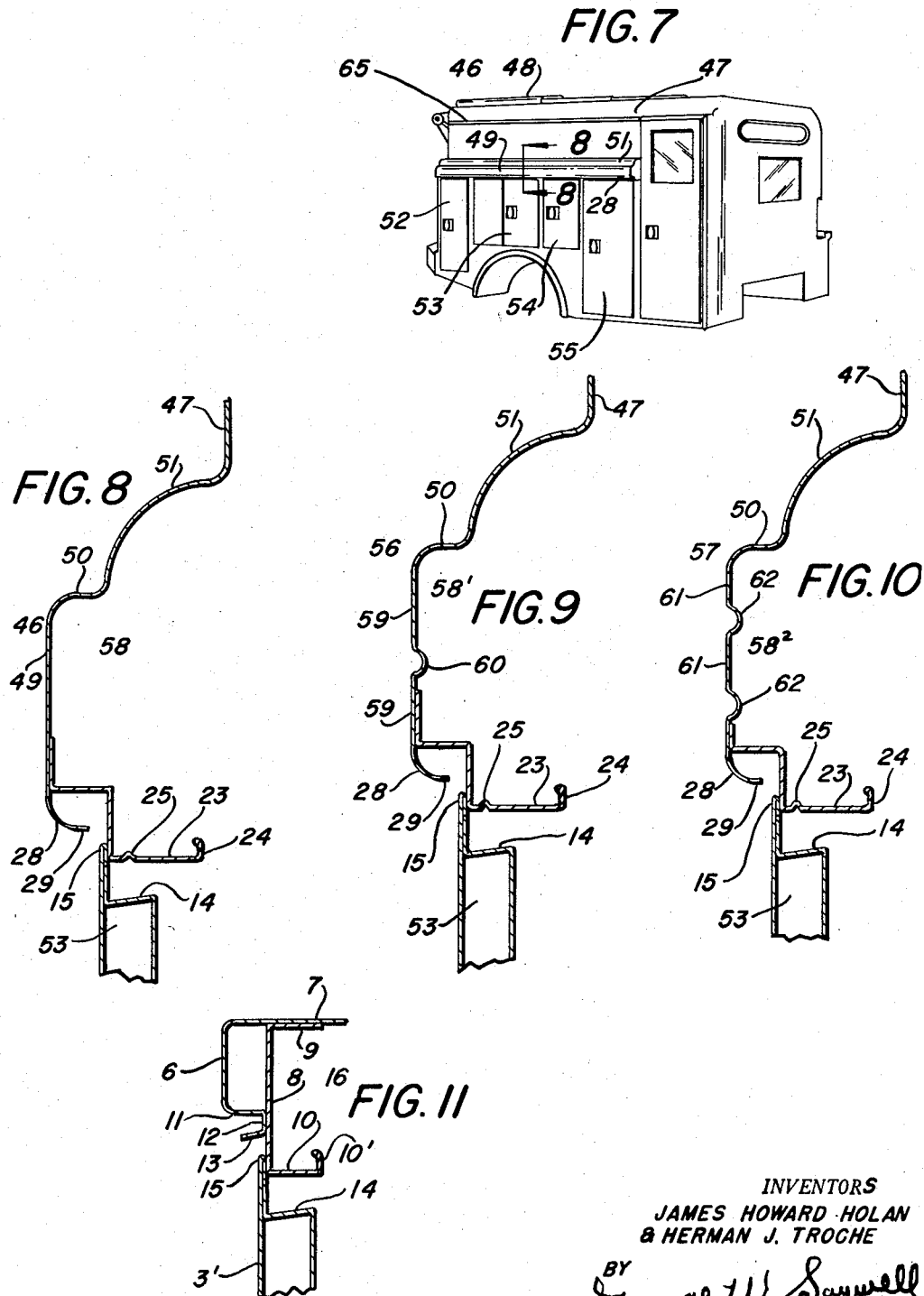

United States Patent Office

2,772,913
Patented Dec. 4, 1956

2,772,913
SIDE STRUCTURES OF UTILITY TRUCK BODIES

James Howard Holan, Rocky River, and Herman J. Troche, Fairview Park, Ohio, assignors to J. H. Holan Corporation, Cleveland, Ohio, a corporation of Ohio Application September 3, 1953, Serial No. 378,361

6 Claims. (Cl. 296—28)

The invention relates to side structures of utility truck bodies, and particularly to a side structure formation at or adjacent the top of the body side walls which provides exterior rub rails and drip moldings adjacently above and exterior of the top lapping edges of both vertically and longitudinally hinged outwardly-opening side doors.

The objects of the invention are to provide:
- A deeper rub rail than those previously known;
- More efficient moisture drainage; and
- A saving in material and labor costs.

The improved side structure also provides more commodious upper storage compartments for tools, fittings and other accessories utilized during utility installation and maintenance operations.

The invention is illustrated in the accompanying drawing, and hereinafter described, as applied to truck bodies of the general service type having open tops, general service bodies having high roofs and closable tops, and line construction bodies. Various forms of one of the panels forming the improved upper side structure, said one panel functioning as a rub rail, are also shown and described.

The annexed drawings and the following description set forth in detail certain means illustrating the improvements in truck body upper side structures, such means showing, however, only a few of the various forms in which the principle of the invention may be embodied.

In said annexed drawings:

Figure 1 is a perspective view of an open-top low-roof general service type body of a utility truck having the improvements herein presented, a truck cab and running gear being indicated in broken lines;

Figure 2 is a fragmentary vertical section, upon a greatly enlarged scale, taken in the plane indicated by the line 2—2, Figure 1;

Figure 3 is a perspective view of a body only, having the improvements herein presented, the body being of the general service type having a high roof and a closeable top, the upper side body structure being a modification of the form thereof shown in Figures 1 and 2;

Figure 4 is a fragmentary vertical section, upon a greatly enlarged scale, taken in the plane indicated by the line 4—4, Figure 3;

Figures 5 and 6 are views similar to Figures 3 and 4, respectively, except that a still further modification of the upper side body structure is shown;

Figure 7 is a perspective view of a body only of the line construction type in which has been embodied one form of the improved upper side structure;

Figure 8 is a fragmentary vertical section, upon a greatly enlarged scale, taken in the plane indicated by the line 8—8, Figure 7;

Figures 9 and 10 are fragmentary vertical sections of line construction bodies having improved upper side structures of different forms, each of which forms is somewhat modified from that form thereof shown in Figures 7 and 8; and Figure 11 is a fragmentary vertical section of a well-known upper side body structure providing a rub rail and a drip molding for utility truck bodies, over which well-known structure the invention herein shown and described is an improvement.

Referring to the annexed drawings in which like elements are designated by the same respective numbers in the several views, and first particularly referring to Figures 1 and 2, a utility truck is shown having the body 1 and cab 2. The body 1 is of the general service type having an open top $1^1$ and low roof parts $1^2$ on both sides of the open top $1^1$. As is usual, the body 1 is provided with a plurality of exterior outwardly-opening doors on both sides, the particular body 1 shown having the same number and arrangement of doors on each side. These doors, except the lower rear one $3^2$, are formed to make sealing joints at their top edges with the rub rail and cooperating structure forming an important part of the invention herein presented. The roof parts $1^2$ form the tops of certain upper compartments 5 on the sides of the body 1, these compartments 5 being above a front vertical door 3 and two top longitudinal doors $3^1$ serving as closures for lower body compartments. These lower compartments are arranged on both sides of a working floor 4.

The invention herein presented, Figures 1 and 2, relates to those top parts of the structure on each side of the body 1 which at their top sides merge into and buttress the roof parts $1^2$ which cover the upper side compartments 5, and which, at their bottom edges make sealing joints with the tops of the doors 3 and $3^1$, the intermediate portions of these structure top parts forming rub rails and drip moldings.

In a well-known type of utility body side structure shown in Figure 11 which provides a rub rail and drip molding, the rub rail 6 merges into an upper end horizontal elongated flange 7 which forms the top of a side of the truck body, which flange 7 abuts at its lower face a horizontal flange 9 of a longitudinal channel 8 having a lower flange 10 formed with a beaded inner strengthening flange $10^1$, the channel web 8 forming a sealing joint with a door, $3^1$, for instance, in the closed position of the latter. The door part of the sealing joint is provided by a flange 14 of an inner panel of the door $3^1$ and an edge-abutting doubled flange 15 of an outer door panel. The channel 8 forms a brace for the rub rail 6, the latter having an inwardly-extending lower flange 11 which is bent downwardly at its inner end into a vertical part 12 abutting the channel 8 and terminates in an outwardly-extending drip lip 13. The afore-mentioned structure bounds an upper compartment 16.

The improvements herein presented provide a deeper rub rail 26, Figures 1 and 2, for a body of given dimensions, and replaces the channel 8 of Figure 11 with a flanged horizontal brace 20. The brace 20 has the upwardly-extending flange 21 at its upper end abutting the inside face of the rub rail 26, and an angular downwardly-extending part at its lower end consisting of the vertical section 22 providing a sealing joint with the doubled flange 15 of the door $3^1$, a horizontal upper door jamb part 23, and the vertical jamb terminal strengthening flange 24. The jamb part 23 is upwardly corrugated in an area adjacent the door sealing edge to form a water block 25 disposed within the vertical longitudinal planes defining the door panel 14.

The rub rail 26 will be referred to as the first panel of the improved side structure, and the brace 20 as the second panel thereof.

The rub rail 26, Figures 1 and 2, merges at one end into a horizontal section $1^2$ which buttresses the roof part for one side of the body 1 and at its opposite and lower end into an outwardly-convex inwardly-extending terminal 28 spaced from the downwardly-extending part 22 of the brace 20, thus providing a drip-off lip 29 disposed exteriorly of the sealing joint formed by the vertical part 22 of the brace panel 20 and the upwardly-extended exterior peripheral flange 15 of the door $3^1$.

Any water entering the door opening and thence traveling along the under surface of the upper door jamb part 23 encounters the water block 25 and dripping therefrom falls freely and drains outwardly of the body 1, if the door $3^1$ is open, and if the door $3^1$ is closed, drains longitudinally of the door $3^1$ along the downwardly and outwardly-sloping inner panel flange 14.

The body side structure just described provides a wider upper side compartment 5, Figure 2, than the compartment 16 of the previously well-known structure, Figure 11, inasmuch as this compartment 5, Figure 2, extends outwardly to the inner face of the rub rail 26 instead of terminating in the plane of the inner face of the channel 8, Figure 11.

In the form of the invention shown in Figures 3 and 4, the rub rail 30 is formed with a longitudinal outwardly-concave corrugation 31 and the brace leg 33 of the brace 32 abuts the inside face of the rub rail 30 adjacently below the corrugated area. This structure provides a compartment 27. The invention is shown in Figures 3 and 4 as applied to a general service body 35 having a closeable top 37, and a high roof 36 which provides for a plurality of roof compartments above the compartment 27, shown as two compartments 34 in Figure 3.

In the form of the invention shown in Figures 5 and 6, the exterior side surface 39 merges at the top first into an outwardly-concave corrugation forming a rub rail 40 and thence into an inwardly-extending horizontal panel 41 which in turn merges into and buttresses the side structure of a high roof 42 of a body 38 having a closeable top 43. The side surface 39 terminates at the bottom in an outwardly-extended outwardly-convex formation 44 having the drip-off edge 45. The formation 44 serves as a second rub rail spaced from and below the rub rail 40. The upwardly-extending flange 21 of the second panel 20 abuts the inside face of the side surface 39 intermediate the respective upper and lower rub rails 40 and 44. The upper compartment $27^1$ and the roof compartments 34 are indicated in Figure 5.

In Figures 7, 8, 9, and 10, the invention in different forms is shown applied to a line construction body. This type of body is one of greater dimensions than the general service body, serves for more varied purposes, and has a different door arrangement. A perspective view of one of such bodies "46" appears in Figure 7 and shows a high roof 47 and a closeable top 48. A cross-section of the form of the invention applied to the body 46 of Figure 7 is shown in Figure 8. It is similar to the form of the invention shown in Figure 2 and applied to the general service body 1, except that in Figure 8 the rub rail 49 at the top merges into a narrow horizontal panel 50 and thence into a curved and inwardly-extending formation 51 leading to the bottom of the high roof 47 and buttressing the latter. One arrangement of doors for a line construction body is shown in Figure 7 and includes four vertically-hinged doors 52, 53, 54, and 55, 53 indicating a two-part door. It is at the top edges of these doors that the improvements in utility body side structures are applied. The upper large compartment above the door sealing edge provided in the line construction body is indicated by 58.

In Figure 9 a form of rub rail 59 is shown for a body 56, having an intermediate outwardly-concave corrugation 60 between upper and lower parts of the rub rail 59. In this form of upper side structure the upwardly-extending brace flange of the second side structure panel abuts the inside face of the first panel adjacently below the corrugation 60.

In Figure 10 the rub rail 61 of a body 57 has two spaced outwardly-concave corrugations 62, thus forming three vertically-spaced rub rail parts. The upwardly-extending brace flange of the second side structure panel abuts the inside face of the first panel adjacently below the bottom concave portion 62.

In each of the forms of high roof bodies shown in Figures 3, 5, 7, 9, and 10, roof compartments 34 are provided, above the upper compartments 27, $27^1$, 58, $58^1$, and $58^2$, respectively, of the main lower part of the body.

A bead is provided on each of the types of high roofs shown in Figures 3, 5, and 7, respectively, and these beads are respectively designated by the reference characters 63, 64, and 65.

What we claim is:

1. A truck body upper side structure comprising a panel formed at its upper end to buttress a body roof, said panel forming a rub rail and having a lower end inwardly-extended flange forming a drip molding, a second and substantially horizontal panel formed with an inner end downwardly-extended flange, the outer end of said second panel abutting the inside face of the first panel and serving as a brace for the first panel, and a body door having spaced longitudinal exterior and interior panel members, the door having an upwardly-extended exterior peripheral flange, the inner door panel having a peripheral flange sloping downwardly and outwardly and formed with an upwardly-extending terminal portion secured to the upwardly-extended peripheral door flange, the downwardly-extended flange of the brace panel having sealing engagement with said upwardly-extended exterior peripheral door flange inwardly of the drip molding, and the brace panel being formed with an inwardly-extending substantially horizontal door jamb part having a water block disposed within the vertical longitudinal planes defining said downwardly and outwardly-sloping inner door panel flange, whence water dripping from the water block falls freely and drains longitudinally along said inner door panel flange.

2. A truck body upper side structure characterized as in claim 1 in which the brace has an upwardly-extending flange abutting the inside face of the rub rail panel.

3. A truck body upper side structure characterized as in claim 1 in which the drip molding is an outwardly-convex formation having a drip-off lip.

4. A truck body upper side structure characterized as in claim 1 in which the rub rail panel is formed with a longitudinal outwardly-concave corrugation intermediate its ends and in which the brace abuts the inside face of the rub rail adjacently below the corrugation.

5. A truck body upper side structure characterized as in claim 1 in which the rub rail panel has upper and lower outwardly-convex portions forming vertically-spaced rub rails, in which the upper rub rail merges into the upper roof-buttressing end of said panel, and in which the brace abuts the inside face of the rub rail panel intermediate the upper and lower rub rails.

6. A truck body upper side structure characterized as in claim 1 in which the rub rail panel has upper and lower spaced outwardly-concave portions respectively spaced from its upper roof-buttressing end and its lower drip-molding end, whereby three vertically-spaced rub rails are formed, in which the upper rub rail merges into the roof-buttressing end of said panel, and in which the brace abuts the inside face of the rub rail panel adjacently below the lower outwardly-concave portion.

References Cited in the file of this patent

UNITED STATES PATENTS

| | | |
|---|---|---|
| 1,123,652 | Anderson | Jan. 5, 1915 |
| 1,775,251 | Lundahl | Sept. 9, 1930 |
| 1,844,548 | Hammerl | Feb. 9, 1932 |
| 1,845,054 | Meinel | Feb. 16, 1932 |
| 2,101,557 | Mussey et al. | Dec. 7, 1937 |
| 2,124,776 | Hawkins | July 26, 1938 |
| 2,159,022 | Hawkins | May 23, 1939 |
| 2,172,571 | Theriault | Sept. 12, 1939 |
| 2,561,098 | Cole | July 17, 1951 |
| 2,619,204 | Troche et al. | Nov. 25, 1952 |